Aug. 25, 1964 B. M. TAYLOR, JR 3,145,474

PERSPECTIVE OR ORTHOGRAPHIC PLOTTER

Filed March 5, 1962 4 Sheets-Sheet 1

Bernard M Taylor Jr

BERNARD M. TAYLOR, JR.
*Inventor* by Keith D. Beecher

*Attorney*

BERNARD M. TAYLOR, JR.
*Inventor*

*by Keith D. Beecher*
*Attorney*

Aug. 25, 1964 B. M. TAYLOR, JR 3,145,474

PERSPECTIVE OR ORTHOGRAPHIC PLOTTER

Filed March 5, 1962 4 Sheets-Sheet 3

BERNARD M. TAYLOR, JR.
*Inventor*

*by Keith D. Beecher*
*Attorney*

FIG. 4A
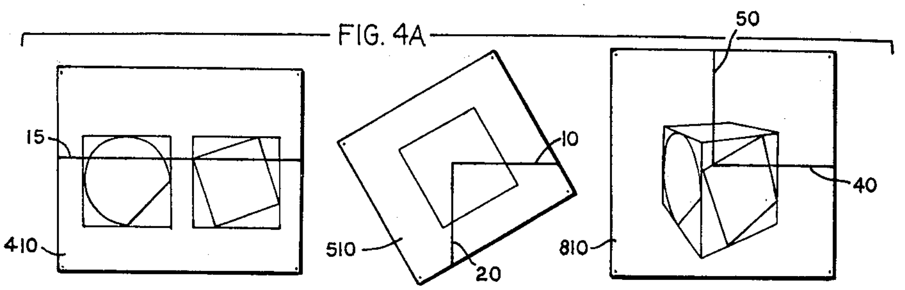
FIG. 4B
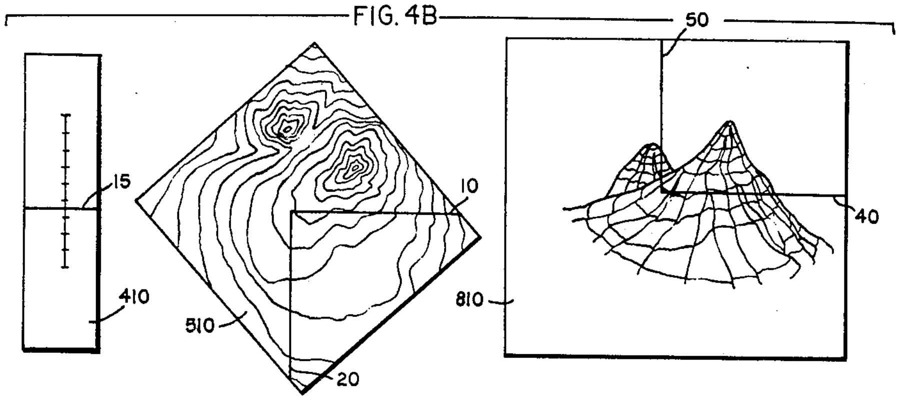
FIG. 4C
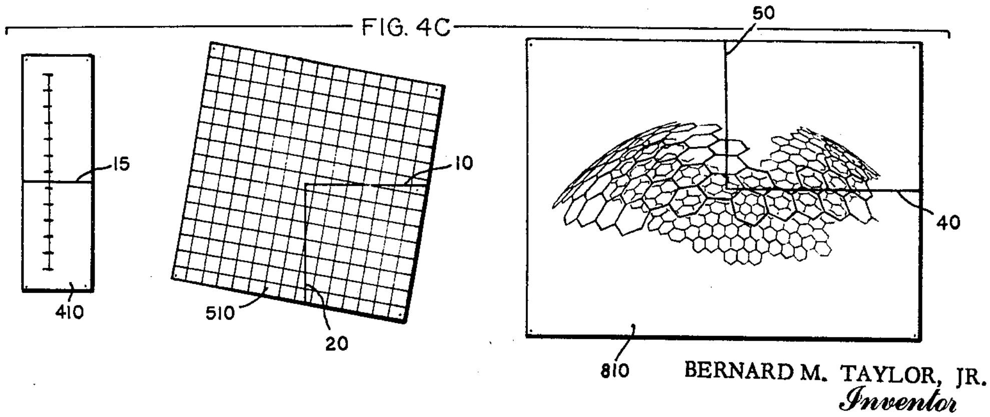
FIG. 4
BERNARD M. TAYLOR, JR.
*Inventor*
by *Keith D. Beecher*
*Attorney*

United States Patent Office 3,145,474
Patented Aug. 25, 1964

3,145,474

PERSPECTIVE OR ORTHOGRAPHIC PLOTTER

Bernard M. Taylor, Jr., 2604 6th St., Santa Monica, Calif.

Filed Mar. 5, 1962, Ser. No. 177,576
14 Claims. (Cl. 33—18)

The present invention relates to two-dimensional plotters, and it relates more particularly to an improved system and apparatus for plotting two-dimensional perspective and orthographic projections.

The present invention finds utility in the plotting of two-dimensional perspective and orthographic projections of three-dimensional objects specified, for example, by their actual dimensions, by plan and elevation drawings of the objects, or by contour maps.

The system and apparatus of the invention is applicable to such fields, for example, as architectural rendering, advertising illustration, technical and industrial production drawing, installation and service instruction, piping and wiring diagramming, text book illustration, and so on.

The system and apparatus of the invention also has application, for example, for the stereo-optical investigation of atmospheric conditions, of underwater strata, of configurations from borings into the earth, and the like.

In brief, it is a general object of the invention to provide an improved system and apparatus which is capable of producing, in a simple and straightforward manner, pictorial projections on a basis heretofore considered impractical.

In one embodiment of the plotting system and apparatus of the invention, as will be described, a plan drawing or topographic map of the subject matter is placed in position on the top surface of the apparatus; and an elevation drawing, or scale of heights, is also placed in position on the top surface of the apparatus.

The imaginary observer's selected position is then set into the apparatus, and the apparatus is activated. The plan and elevation drawings are traced out in a manner to be described, as, for example, by a ball point pen held in slots in movable tracing members, and which moves the tracing members as the ball point pen is traced across the drawings. These tracing members form components of the apparatus and, in a manner to be described, perform potentiometer adjustments as they are moved by the ball point pen across the plan and elevation drawings.

The desired orthographic or perspective projection is automatically plotted by the apparatus as the tracing members are so moved. The projection is made with respect to a predetermined picture plane in the case of the orthographic projection, or with respect to a predetermined position of the imaginary observer in the case of the perspective projection.

A further object of the invention, therefore, is to provide an improved system and apparatus for plotting perspective projections of contour lines or points as seen by an observer in a predetermined position in space; or to provide orthographic projections of the contours, or points, with respect to any selected picture plane in space.

A further object is to provide such an improved system and apparatus which is so conceived that the observer, or picture plane, may assume any desired position in space for the purpose of the projections, without any mechanical or geometrical limitations.

Yet another object of the invention is to provide such an improved system and apparatus which is mathematically exact and precise in its operation, and which does not depend upon inexact mathematical approximations in its plotting of the desired perspective or orthographic projections.

Another object is to provide such an improved system and apparatus which is inherently flexible and which is capable of plotting a wide variety of perspective or orthographic projections, including for example, any one-point perspective projections, any two-point perspective projections, any three-point perspective projections, and so on; and including, for example, any simple orthographic projections, any isometric projections, any dimetric projections, any trimetric projections, and so on.

An important feature of the invention is the provision of automatic means in the apparatus and system to be described for automatically rejecting points behind the selected observation point when perspective projections are being made. This automatic means prevents the projection of false representations of points behind the imaginary observer's head, so that the scene as actually viewed by the human eye is precisely simulated.

The latter feature is achieved, for example, by treating negative divisors as zero for perspective projections. The apparatus to be described plots quotients, so that when the negative divisors become zero, the resulting quotient becomes infinite instead of negative The actual plotting element, therefore, instead of moving back behind the position of the imaginary observer to plot negative values, moves to one side and off the plotting surface, so that such negative values are rejected.

In the practice of the present invention, most of the customary problems of locating horizons in perspective, supplying vanishing points, constructing projections of circles, dimensioning; and the problems of exactly projecting curves, warped surfaces, or non-rectangular or amorphous solids or surfaces are eliminated at the outset. The system and apparatus of the invention, therefore, may be utilized for illustrating extremely complex surfaces, topological expressions, and the like, without any particular skill on the part of the draftsman or operator.

The above and other objects, features and advantages of the invention will become apparent upon a consideration of the following specification in conjunction with the accompanying drawings, in which:

FIGURES 4A–4C are exemplary drawings, maps and the like, suitable for tracing by the apparatus of the invention to be described so as to produce desired perspective or orthographic projections of the subject matter thereof.

The drawings of FIGURES 1A–1D, as noted, illustrate the capabilities of the system and apparatus of the invention to plot perspective and orthographic projections. Four examples of observer-object-picture relationships are shown in FIGURES 1A–1D, each with both perspective and orthographic projections represented. Each of the representations of FIGURES 1A–1D embraces a three-dimensional coordinate system which includes an X-axis 10, a Y-axis 20 and a Z-axis 30.

Figure 2:
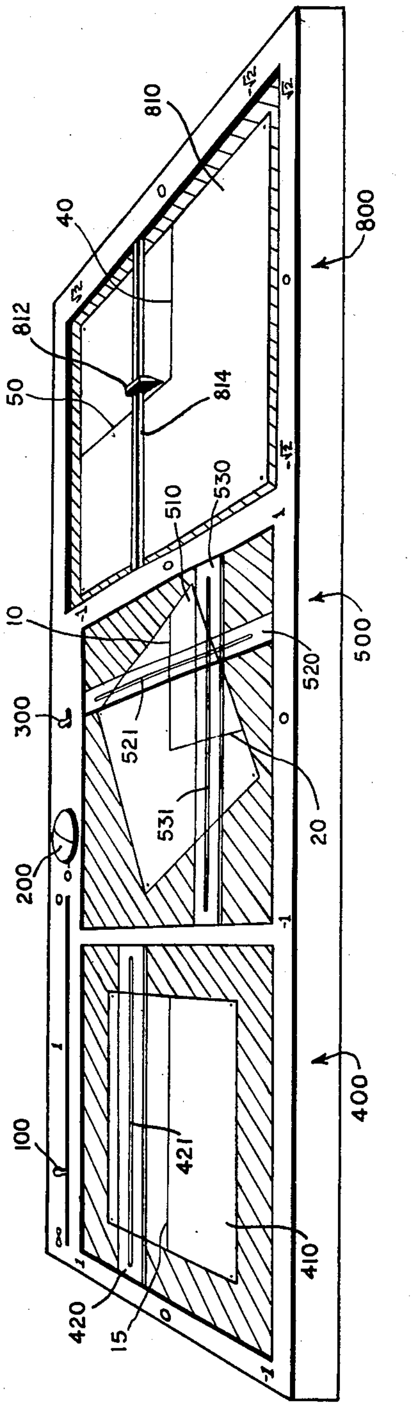
FIGURE 2 is a perspective view of apparatus representing one embodiment of the invention.

As shown in FIGURE 2, the illustrated embodiment of the invention has a flat solid rectangular configuration, and the various controls are effectuated from the top surface of the apparatus. The top surface includes a portion, as will be described, to which the plan representation of the object to be plotted may be placed, and suitable tracing members (also to be described) may be moved over that portion and across the positioned plan representation. Likewise, another portion of the top of the apparatus is intended to receive the elevation drawing of the object, and other tracing members are provided to be moved across that portion and across the elevation drawing.

The apparatus of FIGURE 2 may be divided into eight interdependent sub-systems. These sub-systems include an observer distance selector 100. This selector is in the form of a slider which may be moved in a slot between a calibrated "infinity" position at one extremity, through a unit "one" position, to a calibrated "zero" position at the other extremity. Movement of this slider actuates a corresponding group of potentiometers in the system, as will be described in conjunction with FIGURE 3.

A second sub-system in the apparatus of FIGURE 2 includes an observer-direction selector 200. This latter selector takes the form of a rotatable control which may be manually rotated so as to place the imaginary observer at any desired vertical-angular position with respect to the object to be projected.

The apparatus of FIGURE 2 also includes a perspective-orthographic selector 300. This selector is in the form of a switch which may be set for perspective projections or for orthographic projections.

A further sub-system of the apparatus of FIGURE 2 is an elevation recorder 400. The elevation recorder 400 records the height $C_Z$ of the contour or point to be projected in each instance. As noted above, the elevation drawing of the points or contours, or scale of heights 410 is placed on the elevation recorder area on the top surface of the apparatus of FIGURE 2, as shown. This drawing may at the outset be manually translated up or down so as to place the objects to be projected at their desired positions above and below the X,Y-coordinate plane of FIGURE 1, which is to say, above and below the projection 15 of the X,Y-coordinate plane in FIGURE 2. The drawing may be held in place on the top surface of the apparatus in the proper position by any suitable means, such as by tacks or tape, or the like, and it may be protected by suitable tracing paper.

A marking or tracing member 420, having a slot 421 extending across it, is placed across the elevation drawing 410. The tip of a ball point pen, for example, may be inserted in the slot 421, and the pen is moved from point to point on the tracing paper protecting the drawing 410, moving the marking member 420 with it. As the marking member 420 is moved across the elevation drawing 410, a pair of associated potentiometers is activated, as will be described in detail in conjunction with the system of FIGURE 3.

Figures 1, 1A, 1B, 1C, 1D:
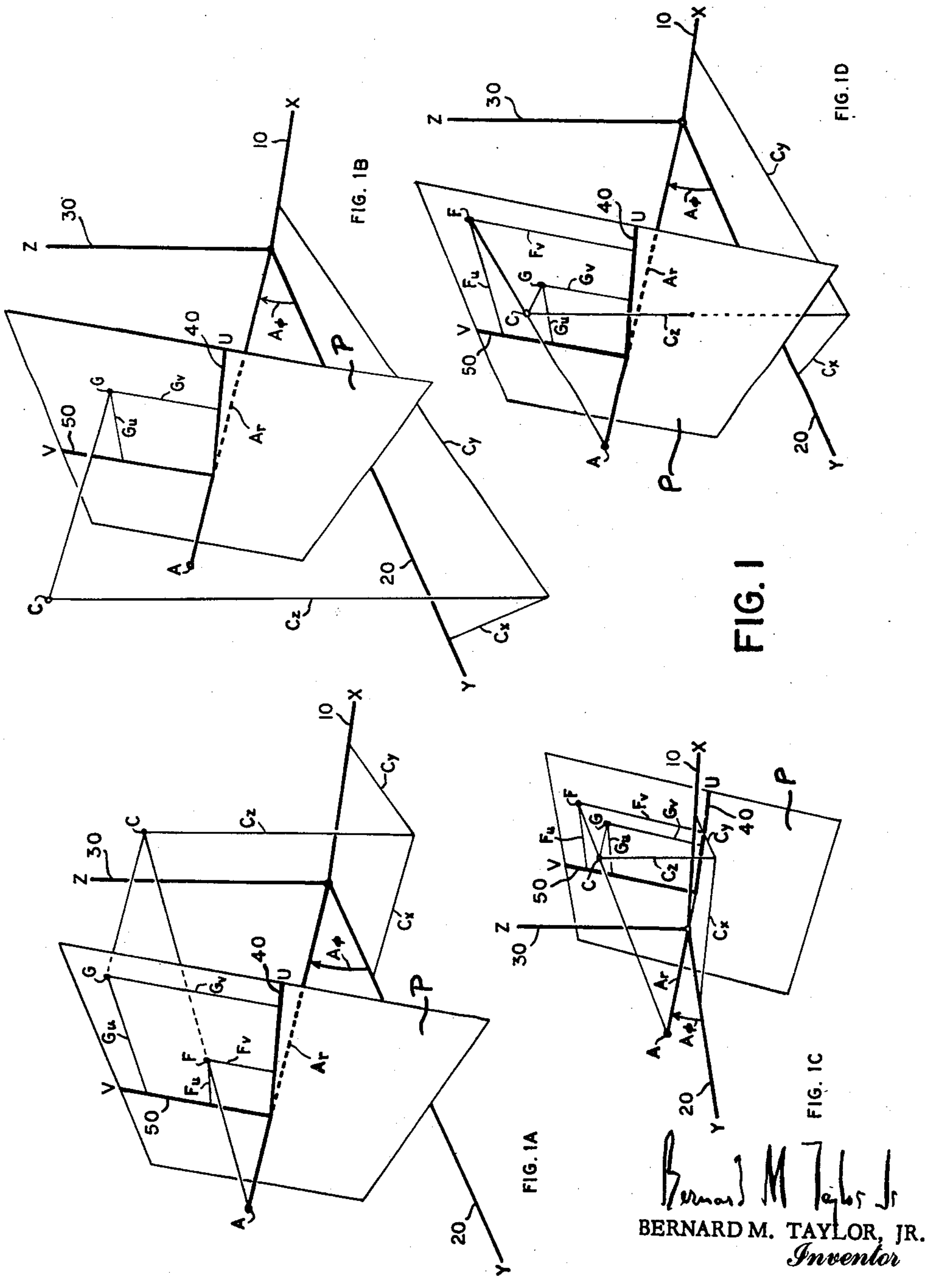
FIGURES 1A–1D are diagrams representing the geometric capabilities of the system and apparatus of the invention.

The apparatus also includes a plan recorder 500. The plan recorder 500 records plan position components $C_X$ and $C_Y$ of the points being projected in each instance. The plan drawing, or contour map, or scale of coordinate widths and lengths, 510, is placed, as noted above, on the plan recorder portion 500 of the top of the apparatus of FIGURE 2, as shown. This drawing may at the outset be manually both translated and rotated into its desired position with respect to the X- and Y-coordinates, 10 and 20. It is rotated so as to place the objects in their desired horizontal-angular position with respect to the imaginary observer, who as illustrated in FIGURE 1 is confined to the infinite Y,Z-coordinate plane. The drawing is taped, or otherwise mounted on the top of the apparatus. This drawing, also, may be protected by suitable tracing paper.

A first marking or tracing member 520 extends across the drawing 510 in one direction, and a second perpendicular marking or tracing member 530 extends across the drawing 510 in a second direction. Both these tracing members 520 and 530 are coupled to potentiometers in the system, as will be described in conjunction with FIGURE 3. The tracing members 520 and 530 are provided with respective slots 521 and 531. The tip of a ball point pen, for example, is inserted through the intersection of the slots 521 and 531, and the pen is moved from point to point on the tracing paper protecting drawing 510, drawing the tracing members 520 and 530 with it across the drawing.

A further sub-system in the apparatus of FIGURE 2 is the plotter 800. The plotter may be driven by a suitable known type of servo mechanism, as will be described, and it serves to plot the desired projections on a paper 810. The paper 810, as shown, is positioned on top of the plotter portion of the apparatus.

The three-dimensional coordinate system of FIGURES 1A–1D is permanently fixed and is unmodifiable with respect to the recorder sub-systems 400 and 500 of FIGURE 2. That is, the X-axis 10 and Y-axis 20 of FIGURES 1A–1D are fixed and unmodifiable in the plan recorder sub-system 500, as shown in FIGURE 2. However, the operator may place the plan drawing 510 in any desired angular and linear position with respect to these coordinates. Likewise, a line 15 in the elevation recorder 400 represents the projection of the X,Y-coordinate plane; and the operator translates the elevation drawing 410 into any desired position with respect to said coordinate system.

The imaginary observer is represented as "A" in FIGURES 1A–1D, and his position is restricted to the Y,Z-coordinate plane. This, however, does not restrict the flexibility of the apparatus of FIGURE 2, because the plan drawing 510 may be rotated and moved linearly by the operator to any desired position in selecting any particular view, as mentioned above.

The distance from the 3-dimensional origin to the observer A is represented in FIGURES 1A–1D by the line vector $A_r$. This distance is unrestricted, and it may range from 0 to infinity. The distance $A_r$ is selected by means of the observer-distance selector 100 of FIGURES 2 and 3.

The vertical direction from the 3-dimensional origin to the observer A is represented in FIGURES 1A–1D by the angle $A_\phi$. This direction, likewise, is unrestricted, and it may range through any vertical angle lying in the Y,Z-coordinate plane. The direction $A_\phi$ is selected by means of the observer-direction selector 200 of FIGURES 2 and 3.

The picture plane P of FIGURES 1A–1D is perpendicular to the line vector $A_r$, and this plane is spaced from the observer A by a particular distance. For purposes of convenience and simplicity, this distance will be considered herein to be unity.

The system of the invention, as will become more evident as the description proceeds, simulates a camera having a fixed, unit focal length. Therefore, as the observer distance $A_r$ increases, the size of the picture projected into the picture plane correspondingly decreases.

The picture plane P need not fall between the observer A and the 3-dimensional origin, as it does in the system of FIGURES 1A, 1B and 1D. In fact, the picture plane actually falls beyond the 3-dimensinal origin whenever the observer distance $A_r$ is less than unity. The latter case is illustrated in FIGURE 1C.

Figure 3:
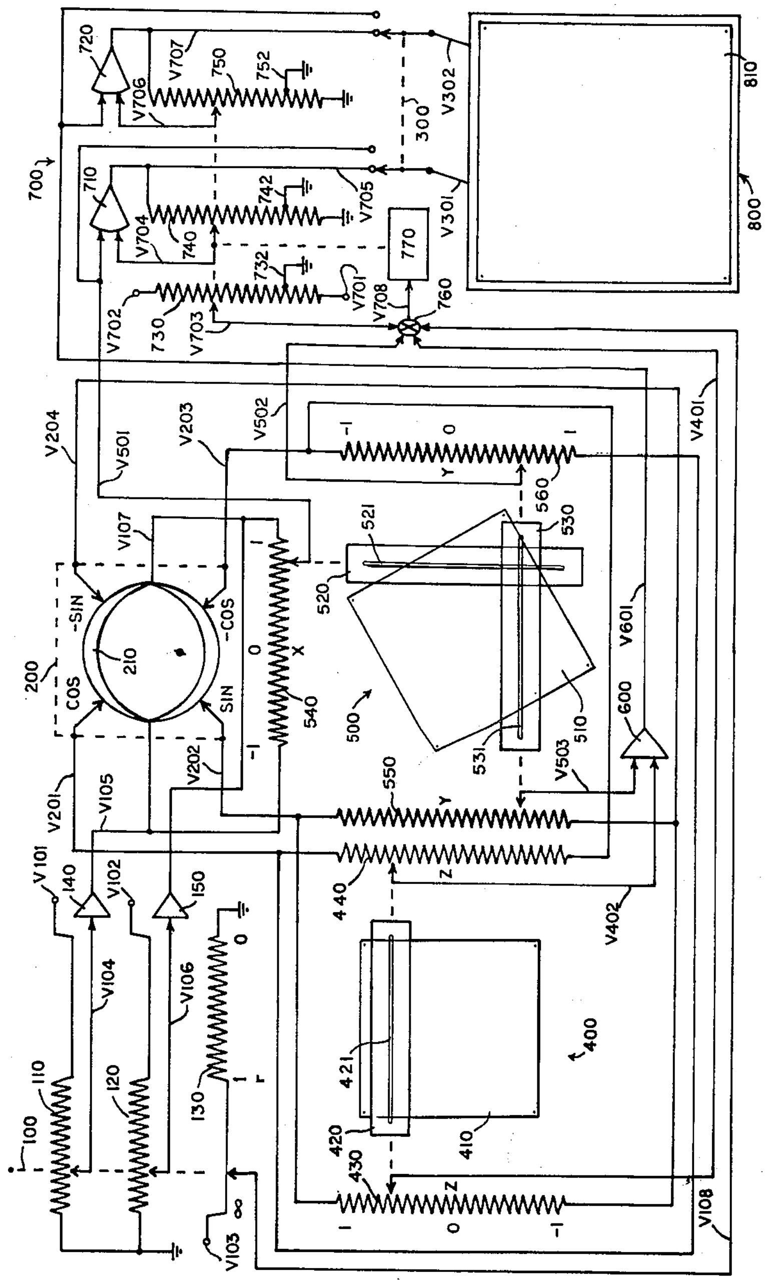
FIGURE 3 is an electric circuit diagram representing the system of the invention in accordance with one embodiment thereof.

In FIGURES 1A–1D, the point C is a projected point which represents the position of the ball point pens in the slots 421, 521 and 531 of FIGURES 2 and 3 at any particular instant. The projected point C is restricted only to the arbitrary volume of space in which, for any particular constructed embodiment of the invention, the recorder sub-systems 400 and 500 are operative. In the embodiment illustrated herein, for example, the volume is cubical, and each dimension ranges from $-1$ to $+1$.

There are three dimensions for the projected point C, namely, $C_x$, $C_y$ and $C_z$. The projected point C, therefore, has three degrees of freedom, namely the Cartesian coordinates $C_x$ and $C_y$ (or plan position), and the Cartesian coordinate $C_z$ (or height). These coordinates are all illustrated in FIGURES 1A–1D.

The projected point C may fall on either side of the picture plane, as illustrated in FIGURES 1A, 1C and 1D. The projected point C may even fall behind the observer A, as illustrated in FIGURE 1B. The system and apparatus of the invention, as mentioned above, is so conceived that a meaningful pictorial output for the condition of FIGURE 1B can occur only for orthographic projections and never for perspective projections.

The picture plane P of FIGURES 1A–1D may extend to an indefinitely large size. Points in this plane are designated in terms of a two-dimensional coordinate system. The two-dimensional coordinate system includes two orthogonally related coordinates, designated the U-axis 40 and the V-axis 50; these axes being illustrated in FIGURES 1A–1D. The origin of the two-dimensional system is located at the intersection of the picture plane with the observer distance vector $A_r$. The V-axis 50 of the picture plane extends along the intersection of the picture plane with the Y,Z-plane of the three-dimensional coordinate system.

The central portion of the picture plane of FIGURES 1A–1D appears upon the plotter area 800 on the top surface of the apparatus of FIGURE 2. In FIGURE 2, the U-axis 40 and the V-axis 50 extend across the plotting paper 810 in the illustrated manner.

In FIGURES 1A, 1C and 1D the perspective projection of the point C into the picture plane is identified as F; this projection having planar coordinates $F_u$ and $F_v$ in the picture plane. However, when the projected point C is actually behind the observer (as in FIGURE 1B), and as mentioned above, no perspective projection F exists. The apparatus of the invention, like a camera and like the human eye, cannot project such a point.

The orthographic projection of the point C in the picture plane, useful for simple orthographic projections, auxiliary orthographic projections, isometric orthographic projections, dimetric orthographic projections, and trimetric orthographic projections, for example, is identified as point G in FIGURES 1A–1D. The projected point G has two planar coordinates in the picture plane, namely $G_u$ and $G_v$. An orthographic projection G of point C into the picture plane always exists regardless of where the point C is located, and regardless of the aspect of the observer or picture plane. Therefore, the apparatus of the invention will always project the point G, when an orthographic projection is desired, as determined by the setting of the switch 300 of FIGURE 2.

With reference now to FIGURE 3, the system illustrated therein represents one embodiment of the invention. It will be observed that the system of FIGURE 3 includes the elevation tracing member 420 of FIGURE 2 which is moved by the operator in the described manner across the elevation drawing 410 in the elevation recorder sub-system 400. The system also includes the plan tracing members 520 and 530 which, as also described, are moved by the operator across the plan drawing 510 in the plan recorder sub-system 500. Also included in the system of FIGURE 3 are the observer distance selector 100 and the observer direction selector 300. The system of FIGURE 3 also includes an operational summing amplifier sub-system 600, and a divider sub-system 700, as will be described.

The observer-distance selector sub-system includes the slider 100 of FIGURE 2. This slider is mechanically coupled to the movable arms of three potentiometers 110, 120 and 130.

The potentiometer 110 has one of its fixed contacts connected to ground, and a positive potential V101 is applied to its other fixed contact from an appropriate direct current potential source. A variable potential V104 is developed at the movable arm of the potentiometer 110, and this variable potential is introduced to an isolation stage 140 which may be a usual emitter follower transistor amplifier. The isolation stage 140 produces an output potential V105.

The potentiometer 120 has one of its fixed contacts connected to ground, and a negative potential V102, approximately equal in magnitude to the potential V101, is applied to its other fixed contact from an appropriate direct current potential source. A variable potential V106 is developed at the movable arm of the potentiometer 120, and this variable potential is introduced to an isolation stage 150 which also may be a usual emitter follower transistor amplifier. The isolation stage 150 produces an output voltage V107.

The potentiometer 130 also has one of its fixed contacts grounded, and a potential V103 is applied to its other fixed contact from an appropriate direct current potential source. A variable output potential V108 is developed at the movable arm of the potentiometer 130. The potential V103 for purposes of convenience and simplicity will be herein made equal to minus unity (−1).

The potentiometers 110 and 120 are constructed to exhibit resistance variations only in the adjustment range from $A_r=\infty$ to $A_r=1$ (i.e. $A_r>1$) of the slider 100; and the potentiometer 130 is constructed to exhibit resistance variations only in the adjustment region of from $A_r=1$ to $A_r=0$ (i.e. $A_r<1$). Therefore, the voltages V104 and V106 do not vary substantially in the region of $A_r<1$; and such that the voltage 108 does not vary substantially in the region calibrated $A_r>1$.

The voltage losses in the isolation stages 140 and 150 must be independent of the settings of the observer direction selector sub-system 200 and of the orthographic/perspective selector sub-system 300; and of the setting of the elevation recorder sub-system 400 and plan recorder sub-system 500. These losses may be compensated by selecting the voltages V101, V102 and V103 for the relations $$V105=-V107=-V103=1$$

when $$0\leqslant A_r\leqslant 1$$

The calibration of $A_r$ on the distance selector 100 is calculated on the basis of the relations $$V108=-A_r$$

when $$0\leqslant A_r\leqslant 1$$

and $$V105=-V107=1/A_r$$

when $$1\leqslant A_r\leqslant \infty$$

Therefore, the voltages V101, V102, V104, V105, V107 and V108 have the over-all limits $$\begin{aligned}&V101\geqslant 1\\&V102\leqslant -1\\&V103=-1\\&0\leqslant V104\leqslant V101\\&0\leqslant V105\leqslant 1\\&V102\leqslant V106\leqslant 0\\&-1\leqslant V107\leqslant 0\\&-1\leqslant V108\leqslant 0\end{aligned}$$

The voltage V105 from the observer-distance selector sub-system 100 is applied to one of the fixed contacts of the potentiometer 540 in the plan recorder sub-system 500, and to one of the fixed contacts of the potentiometer 210 in the sub-system 200. The equal but opposite voltage V107 therefrom is applied to the other fixed contact of the potentiometer 540.

The observer-direction selector sub-system 200 of FIGURE 3 includes a sine-cosine trigonometric potentiometer 210. The potentiometer 210 is calibrated through the range $0\leqslant A_\phi\leqslant 2\pi$ radians.

The equal but opposite input voltages V105 and V107, derived from the observer-distance selector sub-system 100, are applied to the two fixed contacts of the potentiometer 210. The movable arms of the potentiometer 210 respectively produce an output sine voltage V202, an output minus-sine voltage V204, an output cosine voltage V201, and an output minus-cosine voltage V203.

The output cosine voltage V201 is introduced to one of the fixed contacts of a potentiometer 440 in the elevation recorder sub-system 400 and to one of the fixed contacts of a potentiometer 560 in the plan recorder sub-system 500.

The output sine voltage V202 is applied to one of the fixed contacts of the potentiometer 430 in the elevation recorder sub-system 400, and to one of the fixed contacts of a potentiometer 550 in the plan recorder sub-system 500.

The output minus-cosine voltage V203 is applied to the other fixed contact of the potentiometer 560 and to the other fixed contact of the potentiometer 440. The output minus-sine voltage V204 is applied to the other fixed contact of the potentiometer 550 and to the other fixed contact of the potentiometer 430.

The values and ranges of the voltages V201, V202, V203 and V204 are $$V201=V105 \cos A_\phi$$
$$V202=V105 \sin A_\phi$$
$$V203=V107 \cos A_\phi$$
$$V204=V107 \sin A_\phi$$
$$-1\leqslant V201\leqslant 1$$
$$-1\leqslant V202\leqslant 1$$
$$-1\leqslant V203\leqslant 1$$
$$-1\leqslant V204\leqslant 1$$

The perspective/orthographic selector switch sub-system 300 selects from the several voltages available for the plotter sub-system 800.

When the selector switch is set to "perspective," the input voltages V301 and V302 for the plotter sub-system are derived respectively from operational amplifiers 710 and 720 of the perspective divider sub-system 700. These amplifiers each respond to a first input signal which becomes effectively a numerator in the amplifier, and to a second input signal which becomes effectively a divisor in the amplifier, to produce an output signal which corresponds to the amplified quotient of the two input signals. Operational amplifiers per se are known to the art, and for that reason, a detailed circuit explanation of the amplifiers 710 and 720 will not be included herein. The outputs of the amplifiers 710 and 720 are designated V705 and V707, respectively.

On the other hand, when the selector switch in the sub-system 300 is set to "orthographic," the input voltages V301 and V302 to the plotter sub-system 800 are derived directly from the movable arm of the potentiometer 540 in the plan recorder sub-system, whose potential is designated V501, and from the summing amplifier sub-system 600 whose output potential is designated V601.

The input voltages V301 and V302 to the plotter sub-system 800 when the selector sub-system 300 is set to "orthographic" range between $-\sqrt{2}$ and $\sqrt{2}$. This also applies to the most useful values of the input voltages V301 and V302 when the sub-system 300 is set to the "perspective" position.

As noted above, the elevation recorder sub-system 400 records the height $C_z$ of the projected contour or point. The marker member 420 of that sub-system is mechanically coupled to the movable arms of the potentiometers 430 and 440. Therefore, these arms move, as the marker 420 is moved from point to point on the elevation drawing 410.

The potentiometers 430 and 440 represent the Z-coordinates from $-1$ to $+1$. The variable voltage V401 is produced at the movable arm of the potentiometer 430, and the variable voltage V402 is produced at the movable arm of the potentiometer 440.

The voltages V401 and V402 have the relationships $$-1\leqslant C_z\leqslant 1$$
$$V401=V105\cdot C_z \sin A_\phi$$
$$V402=V105\cdot C_z \cos A_\phi$$
$$-1\leqslant V401\leqslant 1$$
$$-1\leqslant V402\leqslant 1$$

The plan recorder sub-system, as mentioned above, records the plan position coordinates $C_x$ and $C_y$ of the point C being projected at any instant. The tracing member 520 is mechanically coupled to the movable arm of the potentiometer 540; and the tracing member 530 is mechanically coupled to the movable arms of the potentiometers 550 and 560. The potentiometer 540 represents the X-coordinates from $-1$ to $+1$, and the potentiometers 550 and 560 represent the Y-coordinates from $-1$ to $+1$.

The output voltage V501 is developed at the movable arm of the potentiometer 540, as noted. Likewise, variable output voltages V502 and V503 are developed at the movable arms of the potentiometers 560 and 550 respectively. These voltages conform to the relationships $$V501=C_x\cdot V107$$
$$V502=V105\cdot C_y \cos A_\phi$$
$$V503=V107\cdot C_y \sin A_\phi$$
$$-1\leqslant V501\leqslant 1$$
$$-1\leqslant V502\leqslant 1$$
$$-1\leqslant V503\leqslant 1$$

The operational summing amplifier 600 sums the voltage V402 from the movable arm of the potentiometer 440 in the elevation recorder sub-system 400 with the voltage V503 from the movable arm of the potentiometer 550 in the plan recorder sub-system 500, to produce an output voltage V601. The voltage $$V601=-V402-V503$$

and it never exceeds the boundaries $$-\sqrt{2}\leqslant V601\leqslant\sqrt{2}$$

The perspective divider sub-system 700 becomes operational only when the selector switch in the sub-system 300 is set to the "perspective" position. The sub-system 700 includes the open-loop operational amplifiers 710 and 720; and it also includes a group of three servo potentiometers 730, 740 and 750. Also included in the sub-system 70 is a servo device 770, and a summing network 760.

Each of the potentiometers 730, 740 and 750 includes respective grounded taps 732, 742 and 752. A fixed voltage V701 is introduced to one of the fixed contacts of the potentiometer 730, and a fixed voltage V702 is applied to the other fixed contact of this potentiometer. A variable voltage V703 is developed at the movable arm of the potentiometer 730, and this variable voltage is introduced to the summing network 760.

The voltage V501 from the movable arm of the potentiometer 540 is applied to the operational amplifier 710, as is the voltage V704 from the movable arm of the potentiometer 740. The output voltage V705 from the amplifier 710 is applied to one of the fixed contacts of the potentiometer 740, the other fixed contact being grounded.

The voltage V601 from the summing sub-system 600 is applied to the operational amplifier 720, as is the voltage V706 from the movable arm of the potentiometer 750. The output voltage V707 from the operational amplifier is applied to one of the fixed contacts of the potentiometer 750, the other fixed contact thereof being grounded.

The servo device 770 drives the movable arms of the potentiometers 730, 740 and 750. The servo device derives its input voltage V708 from the summing network 760. The voltage V108 from the potentiometer 130, the voltage V401 from the potentiometer 430, and the voltage V502 from the potentiometer 560 are all applied to the summing network 760, and the sum of these voltages is compared with the voltage V703 from the potentiometer 730 to produce an error voltage V708 to drive the servo device 770 in a direction such that the potentiometer 730 reduces the error voltage V708 to zero.

The input voltages to the sub-system 700 include a first dividend voltage V501 from the potentiometer 540 and a second dividend voltage V601 from the summing amplifier sub-system 600.

As noted above, the servo motor 770 continually adjusts the voltage V703 in a direction to reduce the error voltage V708 to zero.

The servo potentiometers 730, 740 and 750 include the ground taps 732, 742 and 752, or equivalent means, which serve to make both the voltages V704 and V706 equal to zero when the voltage V703 is negative, that is, less than zero. Therefore, the outputs V705 and V707 from the operational amplifiers 710 and 720 become indefinitely large, whenever the voltage V703 swings negative.

This latter feature causes the plotter sub-system 800 to simulate the eye for perspective projections because it is unable to plot these points which, in every case, are located behind the imaginary observer. However, when the voltage V703 is greater than zero, the voltages V705 and V707 are the quotient voltages, and they control the plotter in accordance with their particular magnitudes.

The voltages of the sub-system 700 have the following relationships:

$$\mathrm{V701} \leqslant -\sqrt{2};$$
$$\mathrm{V702} \geqslant 1+\sqrt{2};$$
$$\mathrm{V703} = -\mathrm{V108} - \mathrm{V401} - \mathrm{V502};$$
$$-\sqrt{2} \leqslant \mathrm{V703} \leqslant 1+\sqrt{2};$$
$$\mathrm{V704} = \mathrm{V703} \cdot \mathrm{V705}/\mathrm{V702},\ \mathrm{V703} \geqslant 0;$$
$$\mathrm{V704} = 0,\ \mathrm{V703} \leqslant 0;$$
$$-\infty \leqslant \mathrm{V704} \leqslant \infty;$$
$$\mathrm{V705} = K\left(\frac{-\mathrm{V501}}{\mathrm{V703}}\right),\ \mathrm{V703} \geqslant 0 \text{ where: } K = \mathrm{V702};$$
$$\mathrm{V705} = \pm\infty,\ \mathrm{V703} \leqslant 0;$$
$$-\infty \leqslant \mathrm{V705} \leqslant \infty;$$
$$\sqrt{2} \leqslant \text{useful } \mathrm{V705} \leqslant \sqrt{2};$$
$$\mathrm{V706} = \mathrm{V703} \cdot \mathrm{V707}/\mathrm{V702},\ \mathrm{V703} \geqslant 0;$$
$$\mathrm{V706} = 0,\ \mathrm{V703} \leqslant 0;$$
$$-\infty \leqslant \mathrm{V706} \leqslant \infty;$$
$$\mathrm{V707} = K\left(\frac{-\mathrm{V601}}{\mathrm{V703}}\right),\ \mathrm{V703} \geqslant 0 \text{ where: } K = \mathrm{V702};$$
$$\mathrm{V707} = \pm\infty,\ \mathrm{V703} \leqslant 0;$$
$$-\infty \leqslant \mathrm{V707} \leqslant \infty;$$
$$-\sqrt{2} \leqslant \text{useful } \mathrm{V707} \leqslant \sqrt{2};$$
$$\mathrm{V708} = 0.$$

The plotter sub-system 800 responds in usual manner to the input voltages V301 and V302 to provide a 2-dimensional representation on the paper 810 of FIGURE 2 with respect to the 2-dimensional axes 40 and 50. The plotter includes a usual pen 812 which is slidably mounted on a guide 814. The pen 812 is deflected back and forth along a rectilinear path perpendicular to the axis 50 in response to variations in the voltage V301. This deflection is carried out by use of usual known instrumentalities. The guide 814, itself, is deflected along a rectilinear path perpendicular to the axis 40 in response to variations in the voltage V302. These deflections of the guide 814 are also carried out by usual and known instrumentalities. The pen 812, in this manner, is caused to trace a 2-dimensional representation on the paper 810, and under the control of the voltages V301 and V302.

As described above, the representation traced on the paper 810 in the plotter sub-system is an "orthographic" representation of the tracings made on the plan and elevation drawings 510 and 410 when the selector sub-system 300 is set to the "orthographic" position. The presentation by the plotter is "perspective," on the other hand, when the selector sub-system 300 is set to "perspective."

In the circuit of FIGURE 3, the orthographic representations by the plotter 800 will be inverted with respect to the perspective representations. This can be corrected by providing some means for reversing the voltages for one of the representations, for example. Such a reversal may be achieved, for example, by means of phase inverting amplifiers, or by suitable reversing switching means.

In the use of the apparatus and system described above, the plan drawing, or topographic map, or scale of lengths and widths, 510, is placed under the tracing members 520 and 530 in the plan recorder sub-system 500. The drawing 510 is placed in such a manner that the selected imaginary observer's position falls in the temporary Y, Z-coordinate plane which is fixed in relation to the apparatus, but which is not fixed in relation to the drawing.

The elevation drawing, or scale of heights, 410, is then placed in position in the elevation recorder sub-system 400 under the tracing member 420. The drawing 410 is so placed that the 3-dimensional origin falls on the zero line 15, as explained above.

The desired observer's position, which is established by a selected distance $A_r$, and by a selected direction $A_\phi$, is set into the apparatus by the selectors 100 and 200, as described above.

The apparatus is then activated, and the selected point or contour line is traced on the plan drawing 510 with a ball point pen, for example, inserted into the intersection of the slots 521 and 531 in the respective tracing members 520 and 530; this being carried out after the setting of the elevation tracing member 410 has been made to the correct height for that particular point or contour.

The projection of the point or contour traced out on the plan drawing 510 is instantaneously plotted by the plotter 800. This plotting proceeds with a perspective or orthographic representation, depending upon the setting of the selector sub-system 300.

As noted above, the setting of the selector sub-system 100 determines the observer distance $A_r$. However, for orthographic projections, the setting of the selector 100 has a scaling effect only. That is, settings between 0 and 1 of the selector 100 will yield normal, maximum scale of the orthographic representation by the plotter 800; whereas settings beyond 1 and toward infinity will reduce the scale of the orthographic representation.

It is evident that any number of points and contours can be drawn without further adjustment of the selectors 100, 200 or 300; and without any further adjustment of the position of the drawings 410 or 510.

The representations of FIGURES 4A–4C exemplify the manner in which the apparatus of the invention can be utilized to produce different perspective representations from plan and elevational drawings and the like.

In FIGURE 4A, for example, the plotter 800 produces on the paper 810 a selected perspective view of a cube represented in plan in the drawing 510, and in elevation in the drawing 410.

In FIGURE 4B, for example, the plotter 800 produces on the paper 810 a selected perspective view of hills represented by a topographic map in the drawing 510, and by a scale of heights in the drawing 410.

In FIGURE 4C, for example, the plotter 800 produces on the paper 810 a complex geometrical figure derived from a scale of lengths and widths in the drawing 510, and from a scale of heights in the drawing 410.

In the practice of the present invention, if the object drawn is a rectangular solid, its projections will allow interpretation as simple orthographic[1]; auxiliary orthographic[3]; isometric[2]; dimetric[3]; trimetric[3]; one-point perspective[3]; two-point perspective; three-point perspective; pseudoperspective; 1,1-point stereoscopic; 2,2-point parallel stereoscopic; 3,3-point parallel stereoscopic; 1,2-point convergent stereoscopic; 1,3-point convergent stereoscopic; 2,1-point convergent stereoscopic; 2,2-point convergent stereoscopic; 2,3-point convergent stereoscopic; 3,1-point convergent stereoscopic; 3,2-point convergent stereoscopic; 3,3-point convergent stereoscopic; or pseudoperspective stereoscopic; depending upon whether perspective or orthographic is selected together with aspect considerations.

If the object drawn is non-rectangular in shape, its projections allow interpretation as orthographic, perspective, pseudoperspective, convergent stereoscopic, parallel stereoscopic, or pseudoperspective stereoscopic, depending upon whether perspective or orthographic is selected, together with aspect considerations.

The varieties of pseudoperspective are pictorially superior to the drafting table expedients of cabinet and Cavalier constructions.

The invention provides, therefore, an improved and simple apparatus and system for plotting perspective and orthographic representations. The apparatus and system of the invention is most advantageous in that it permits complex objects and contours to be projected from any desired viewpoint in space in either perspective or orthographic representations. Moreover, the apparatus and system of the invention is most advantageous in that it can be operated by a relatively unskilled workman, and requires no particular advanced training on the part of the draftsman.

While a particular embodiment of the invention has been shown and described, modifications may be made, and the following claims are intended to cover all such modifications as fall within the scope of the invention.

What is claimed is:

1. A system for providing two-dimensional representations of objects specified by three-dimensional dimensions including: plan tracing means for producing plan signals representative of the plan position coordinates of the specified object with respect to a particular three-dimensional coordinate system; height tracing means for producing elevation signals representative of the elevation coordinates of the specified object with respect to the three-dimensional coordinate system; circuit means coupled to said plan tracing means and to said height tracing means and responsive to said plan and elevation signals therefrom for producing first and second control signals respectively related to the coordinates of a particular representation of the specified object with respect to a particular two-dimensional coordinate system; and display means coupled to said circuit means and responsive to said first and second control signals for providing a two-dimensional representation of the specified object.

2. A system for providing a two-dimensional orthographic representation of objects specified by three-dimensional dimensions including: plan tracing means for producing plan signals representative of the plan position coordinates of the specified object with respect to a particular three-dimensional coordinate system; height tracing means for producing elevation signals representative of the elevation coordinates of the specified object with respect to the three-dimensional coordinate system; circuit means coupled to said plan tracing means and to said height tracing means and responsive to said plan and elevation signals therefrom for producing first and second control signals respectively related to the coordinates of a particular orthographic representation of the specified object with respect to a particular two-dimensional coordinate system; and display means coupled to said circuit means and responsive to said first and second control signals for providing the particular orthographic representation of the specified object.

3. The system defined in claim 2 and which includes further circuit means coupled to said plan tracing means and to said height tracing means and responsive to said plan and elevation signals for producing first and second control signals respectively related to the coordinates of a particular perspective representation of the specified object with respect to a particular two-dimensional coordinate system; and which includes selection means for selectively applying the control signals from said circuit means and from said further circuit means to said display means.

4. A system for selectively providing a two-dimensional orthographic or perspective representation of objects specified by three-dimensional dimensions including: plan tracing means for producing plan signals representative of the plan position coordinates of the specified object with respect to a particular three-dimensional coordinate system; elevation tracing means for producing elevation signals representative of the elevation coordinates of the specified object with respect to the three-dimensional coordinate system; first circuit means coupled to said plan tracing means and to said elevation tracing means and responsive to said plan and elevation signals therefrom for producing a first pair of control signals respectively related to the coordinates of a particular orthographic representation of the specified object with respect to a particular two-dimensional coordinate system; second circuit means coupled to said plan tracing means and to said elevation tracing means and responsive to said plan and elevation signals therefrom for producing a second pair of control signals relates to the coordinates of a particular perspective representation of the specified object with respect to a particular two-dimensional coordinate system; display means responsive to said first pair of control signals for providing the particular orthographic representation of the specified object and responsive to said second pair of control signals for providing the particular perspective representation of the specified object; and selection means coupled to said first and second circuit means for selectively applying said first and second pairs of control signals to said display means.

5. The system of claim 4 in which said first circuit means includes first variable means for producing first variable signals representative of the distance from the origin of the three-dimensional coordinate system of the imaginary observation point for the perspective representation, and second variable means for producing second variable signals representative of the direction of the observation point with respect to the origin of the three-dimensional coordinate system, and means for utilizing said first and second variable signals to modify said control signals applied to said display means.

6. The system of claim 4 in which said first circuit means includes means for producing signals representative of the distance from the origin of the three-dimensional coordinate system of the observation point for the perspective representation, and in which said second circuit means includes means for producing an amplitude to at least one of said second pair of control signals which is beyond the capabilities of said display means when the signals from said tracing means are representative of coordinates of said three-dimensional coordinate system behind said observation point.

7. The system of claim 4 in which said first circuit means includes first potentiometer means mechanically coupled to said plan tracing means for producing said plan signals, and second potentiometer means mechanically coupled to said elevation tracing means for producing said elevation signals.

8. The system of claim 5 in which said first variable means includes a manually adjustable control and a plurality of potentiometers mechanically coupled to said control for producing said first variable signals.

9. The system of claim 5 in which said second variable means includes a manually adjustable sine-cosine trigonometric potentiometer for producing said second variable signals.

10. The system of claim 4 in which said first circuit means includes first potentiometer means mechanically coupled to said plan tracing means for producing said plan signals, and second potentiometer means mechanically coupled to said elevation tracing means for producing said elevation signals, first variable circuit means for producing first variable signals representative of the distance from the origin of the three-dimensional coordinate system of the observation point for the perspective representation, second variable circuit means for producing second variable signals representative of the direction of the observation point with respect to the origin of the three-dimensional coordinate system, and circuits coupling said first and second variable circuit means to said first and second potentiometer means for modifying said plan and elevation signals in accordance with the magnitude of said first and second variable signals.

11. The system of claim 4 in which said first circuit means includes means for producing signals representative of the distance from the origin of the three-dimensional coordinate system of the observation point for the perspective representations, and in which said second circuit means includes a pair of dual input operational amplifiers for producing said second pair of control signals, and a servo system including a pair of potentiometers for individually supplying one of the inputs for each of said amplifiers, said last named potentiometers having taps thereon to cause the amplitude of said inputs to be reduced to zero for particular values of the signals from said tracing means representative of coordinates of said three-dimensional coordinate system lying behind said observation point.

12 Apparatus for providing two-dimensional representations of objects specified by three-dimensional dimensions including: a housing having a top surface of planar configuration, said top surface having a first portion intended to receive a diagram representative of the plan position coordinates of the specified object with respect to a particular three-dimensional coordinate system, and said top surface having a second portion intended to receive a diagram representative of the elevation coordinates of the specified object with respect to the three-dimensional coordinate system; a pair of plan tracing members adapted to be moved in mutually transverse relationship over said first portion of said top surface; an elevation tracing member adapted to be moved across said second portion of said top surface; display means including a movable member coupled to said plan and elevation tracing members to trace out a predetermined two-dimensional representation in response to movements of said tracing members; and adjustable selection means for selectively causing said display means to trace out an orthographic or a perspective representation in response to movements of said tracing members.

13. A system for providing two-dimensional representations of objects specified by three-dimensional dimensions including: first control circuit means including means for continuously following contours of the objects in space and for providing three continuously varying signals representing the instantaneous position of any such contour with respect to a particular three-dimensional coordinate system; second control circuit means for producing signals representative of the position and angular attitude of an observer in space; and processing means coupled to said first and second control means and responsive to the signals therefrom for developing output signals representing the pictorial projection of such contour as viewed by the selected observer.

14. The system defined in claim 13 and which includes means included in said processing means to render said processing means inoperative for producing output signals corresponding to any portions of such contour lying outside the view of the selected observer.

References Cited in the file of this patent

UNITED STATES PATENTS

| | | |
|---|---|---|
| 2,442,117 | Davis | May 25, 1948 |
| 2,714,253 | Stone | Aug. 2, 1955 |
| 3,037,382 | Aid et al. | June 5, 1962 |
| 3,060,596 | Tucker | Oct. 30, 1962 |